United States Patent [19]
Hilfman et al.

[11] 4,210,522
[45] Jul. 1, 1980

[54] HYDROCRACKING CATALYST

[75] Inventors: Lee Hilfman; Mark J. O'Hara, both of Mt. Prospect, Ill.

[73] Assignee: UOP Inc., Des Plaines, Ill.

[21] Appl. No.: 954,685

[22] Filed: Oct. 25, 1978

[51] Int. Cl.² .................... C10G 13/02; C10G 23/04; B01J 23/64

[52] U.S. Cl. .................... 208/111; 208/144; 208/264; 252/455 Z; 252/462

[58] Field of Search ............... 208/111; 252/455 Z

[56] References Cited

U.S. PATENT DOCUMENTS

| | | | |
|---|---|---|---|
| 2,892,858 | 6/1959 | Ziegler | 260/448 |
| 3,852,190 | 12/1974 | Buss et al. | 208/138 |
| 4,012,313 | 3/1977 | Buss et al. | 208/139 |
| 4,040,944 | 8/1977 | Kelley et al. | 208/89 |
| 4,123,470 | 10/1978 | Murtha | 260/668 D |
| 4,124,491 | 11/1978 | Antos et al. | 208/139 |
| 4,124,537 | 11/1978 | Gembicki et al. | 252/465 |
| 4,126,850 | 11/1978 | Lauder | 252/462 |
| 4,141,860 | 2/1979 | O'Hara et al. | 208/111 X |

*Primary Examiner*—Delbert E. Gantz
*Assistant Examiner*—G. E. Schmitkons
*Attorney, Agent, or Firm*—James R. Hoatson, Jr.; John G. Cutts, Jr.; William H. Page, II

[57] ABSTRACT

Disclosed is a hydrocracking process utilizing a catalyst comprising a Ziegler alumina-zeolite support, a rare earth exchange metal component and a platinum group metal component.

6 Claims, No Drawings

HYDROCRACKING CATALYST

BACKGROUND OF THE INVENTION

This invention pertains to a hydrocracking process utilizing a catalyst comprising a Ziegler alumina-zeolite support, a rare earth exchange metal component and a platinum group metal component. In the past few years much attention has been devoted to using crystalline aluminosilicates as an element in such hydrocracking catalysts. In general, the crystalline aluminosilicates or zeolites are used in combination with a porous carrier matrix such as silica, alumina, silica-alumina, zirconia, magnesia, titania, etc. In some cases the co-catalytic activity of the crystalline aluminosilicate material and the acidic porous matrix with various metallic promoters has been found to be an effective catalyst material.

SUMMARY OF THE INVENTION

Briefly, in accordance with the present invention there is provided an improved hydrocracking process. The present invention uses a catalyst comprising a Ziegler alumina-zeolite support, a rare earth exchange metal component and a platinum group metal component.

We have found that a hydrocracking catalyst having a Ziegler alumina-zeolite support exhibits superior activity for hydrocracking hydrocarbons.

DETAILED DESCRIPTION

The process of the present invention uses a catalyst comprising a Ziegler alumina-zeolite support, a rare earth exchange metal component and a platinum group metal component.

Certain naturally occurring and synthetic aluminosilicate materials such as faujasite, chabazite, X-type, and Y-type and L-type aluminosilicate materials are commercially available and are effective cracking components. These aluminosilicate materials may be characterized and adequately defined by their X-ray diffraction patterns and compositions. Characteristics of such aluminosilicate materials and methods for preparing them have been presented in the chemical art. They exist as a network of relatively small cavities which are interconnected by numerous pores which are smaller than the cavities. These pores have an essentially uniform diameter at the narrowest cross-section.

These crystalline zeolites are metal aluminosilicates having a crystalline structure such that a relatively large absorption area is present inside each crystal. Access to this area may be had by way of openings or pores in the crystal. They consist basically of three-dimensional framework of $SiO_4$ and $AlO_4$ tetrahedra with the tetrahedra cross-linked by the sharing of oxygen atoms. The electrovalence of the tetrahedra containing aluminum is balanced by the inclusion in the crystal of cations, for example, metal ions, ammonium ions, amine complexes, or hydrogen ions.

It is generally known that alkali metal synthetic zeolites and particularly faujasite which have been exchanged with metal and/or hydrogen ion possess a high degree of activity as catalysts for the conversion of hydrocarbons. In particular, it has been found that rare earth ion exchanged faujasite constitutes a particularly effective catalyst or catalyst ingredient for the cracking of high molecular weight petroleum feedstocks to lower molecular weight derivatives such as gasoline.

To date various mixtures including zeolites have been proposed for the porous support material in the manufacture of hydrocracking catalysts. However, we have discovered that a combination of Ziegler alumina and zeolites yields an unexpectedly active catalyst compared with conventional alumina.

An essential feature of our catalyst is a rare earth exchanged zeolite. The zeolite may be exchanged with rare earth either before or after the Ziegler alumina is combined with zeolite and according to any suitable method or manner. For example, the rare earth salt solution may be prepared using commercially available rare earth salts which are generally a mixture of lanthanum, cerium and minor quantities of other rare earths. Preferably rare earth chlorides are used, however, it is also contemplated that sulfates and nitrates may be used if desired. The rare earth exchange solution, preferably contains from about 0.1 to about 1 mole of rare earth ion salt per liter of solution. The exchange is conducted preferably at a temperature of from about 100° F. to about 210° F. over a period of from about 0.1 to about 3 hours. Generally it is found that during the aforementioned exchange procedure performed on a faujasite, the alkali metal ion content of the faujasite is reduced from an initial level of about 12 to 15% to 1 to 3%.

Another essential feature of the catalyst of the present invention is a hydrogenation component selected from the platinum group metals. One or more hydrogenation components may be suitably employed to provide the desired hydrocracking reactions. The hydrogenation component may be incorporated into the Ziegler alumina-zeolite support by conventional procedure including (1) cation exchange using an aqueous solution of a metal salt wherein the metal itself forms the cations, (2) cation exchange using an aqueous solution of a metal compound in which the metal is in the form of a complex cation with coordination complexing agents such as ammonia, followed by thermal decomposition of the cationic complex, (3) impregnation with a solution of a suitable metal salt in water or in an organic solvent, followed by drying and thermal decomposition of the metal compound. The hydrogenation component is also conventional and includes metals, oxides or sulfides of the platinum group metals. Specific examples include ruthenium, rhodium, palladium, osmium, iridium and platinum or any combination of these metals or their oxides or sulfides. Amounts of the hydrogenation component will usually range from about 0.01% to about 25% by weight of the final composition, based on free metal. Generally, optimum proportions will range from about 0.1% to about 10% by weight. Hydrogenation components can be incorporated by impregnation or cation exchange and the latter method is particularly useful for adding palladium and platinum.

We have discovered that another essential component of the catalyst of the present invention is Ziegler alumina. The unique crystalline alumina powder from which the carrier material used in the present invention is made has been characterized in U.S. Pat. Nos. 3,852,190 and 4,012,313 as a by-product from a Ziegler higher alcohol synthesis reaction as described in Ziegler's U.S. Pat. No. 2,892,858. For purposes of simplification, the name "Ziegler alumina" is used herein to identify this material. It is presently available from the Conoco Chemical Division of Continental Oil Company under the trademark, Catapal. This material is an extremely high purity alpha-alumina monohydrate (boehmite) which after calcination at a high temperature has been shown to yield a high purity gammaalumina. It is commercially available in three forms: (1) Catapal SM—a spray dried powder having a typical surface area of 250 m²/g; (2) Catapal NG—a rotary kiln dried alumina having a typical surface area of 180 m²/g; and (3) Dispal M—a finely divided dispersible product having a typical surface area of about 185 m²/g. For purposes of the present invention, the preferred starting material is the spray dried powder, Catapal SB. This alpha-alumina monohydrate powder may be combined with a zeolite and formed into a suitable catalyst material according to any of the techniques known to those skilled in the catalyst carrier material forming art. The Ziegler alumina-zeolite can be formed in any desired shape or type of carrier material known to those skilled in the art such as spheres, rods, pills, pellets, tablets, granules, extrudates and the like forms by methods well known to the practitioners of the catalyst carrier material forming art. The preferred type of carrier material for the present invention is a cylindrical extrudate having a diameter of about 1/32" to about ⅛" and a length to diameter (L/D) ratio of about 1:1 to about 5:1, with a L/D ratio of about 2:1 being especially preferred. The especially preferred extrudate form of the carrier material is preferably prepared by mixing equal volumes of finely divided Ziegler alumina and sodium form faujasite powder together with a nitric acid solution to form a paste or dough. The resulting dough is then extruded through a suitably sized die to form extrudate particles. These particles are then dried at a temperature of about 200° F. to 400° F. for a period of about 0.1 to about 5 hours and thereafter calcined at a temperature of about 900° F. to about 1500° F. for a period of about 0.5 to about 5 hours to form the preferred extrudate particles of Ziegler alumina-zeolite carrier material.

The hydrocracking feed stocks that may be treated using the instant invention are hydrocarbons boiling above about 650° F. which includes straight-run gas oils, coker distillate gas oils, reduced crude oils, cycle oil derived from catalytic or thermal cracking operations and the like. These fractions may be derived from petroleum crude oils, shale oils, tar sand oils, coal hydrogenation products and the like.

The process of the invention may be carried out in any equipment suitable for catalytic operations. It may be operated batchwise or continuously. Accordingly, the process is adapted to operations using a fixed bed of catalyst. Also, the process can be operated using a moving bed of catalyst wherein the hydrocarbon flow may be concurrent or countercurrent to the catalyst flow. A fluid type of operation may also be employed. After hydrocracking, the resulting products may be separated from the remaining components by conventional means such as adsorption or distillation. Also, the catalyst after use over an extended period of time may be regenerated in accordance with conventional procedures by burning off carbonaceous deposits from the surface of the catalyst in an oxygen-containing atmosphere under conditions of elevated temperature.

The following examples will serve to more particularly illustrate the preparation of the catalysts of the invention and their advantageous properties in hydrocracking hydrocarbons. It is understood that the examples are intended to be illustrative rather than restrictive and the only limit to the scope of the invention is to be provided by the claims hereinafter appended.

Examples 1 and 2 illustrate the preparation and testing of two platinum catalysts. Example 1 is illustrative of the prior art catalysts using a zeolite and a conventional alumina support material. Example 2 is illustrative of the catalysts of the present invention which contain a zeolite and Ziegler alumina.

EXAMPLE 1

Equal quantities of a Linde Na Y, SK-40, sieve material and Kaiser substrate alumina were admixed and extruded with the aid of a small amount of nitric acid solution through a 2 mm die plate. The extrudate was broken into particles with an L/D of about 3. The extrudate particles were dried for about 1 hour at 200° F. and then calcined for about 1 hour at 1100° F. The calcined particles were exchanged with an NH₄NO₃ solution at 200° F. for 16 hours and then washed with water. The resulting water-washed particles were then exchanged with a rare earth salt solution. The rare earth salt solution had a pH of about 4 during the exchange procedure. The rare earth solution was prepared using commercially available rare earth salts which are generally a mixture of lanthanum, cerium and minor quantities of other rare earths. Suitable rare earth salts are chlorides, sulfates and nitrates. The rare earth exchange solution contained about one mole of rare earth salt per liter. The exchange was conducted at a temperature of about 140° F. to about 200° F. over a period of about one hour.

Subsequent to rare earth exchange the support particles were subjected to a calcination conducted at a temperature of about 930° F. over a period of about one hour. This calcination step generally performs the function of fixing the rare earth ion in the support structure and furthermore converts the ammonium ions to hydrogen ions while emitting ammonia. A portion of the resulting calcined rare earth exchanged faujasite-alumina support was prewet with water, then exchanged for 1½ hours at 200° F. with a 10% NH₄NO₃ solution to reduce the sodium level to less than 0.5 wt.%. After water washing, the low sodium content support was calcined for one hour at about 930° F. and for one hour at about 1100° F. The calcined support was then impregnated with an aqueous solution containing chloroplatinic acid to yield a finished catalyst with 0.75 wt.% platinum. The impregnated support was dried and then calcined for about one hour at about 1100° F. A portion of the catalyst prepared as hereinabove described was tested in a continuous hydrocracking apparatus with a vacuum gas oil being employed as the charge stock. The results of an inspection of the vacuum gas oil charge stock are presented in Table I.

TABLE I

| Vacuum Gas Oil Charge Stock Inspection | |
|---|---|
| Specific Gravity, °API | 33.1 |
| Distillation, °F. | |
| IBP | 269 |
| 10 | 475 |
| 50 | 680 |
| 90 | 808 |
| EP | 900 |
| Aromatics, vol. % | 41 |
| Paraffin and Naphthene, vol. % | 59 |

The reaction zone was maintained at a pressure of 1500 psig., a liquid hourly space velocity of 1.2 hr.⁻¹ based on fresh feed, a combined feed rate of 1.5, a hydrogen circulation rate of 10,000 SCFB and a temperature sufficient to obtain 100% conversion to 375° F. end-point gasoline. Activity is judged by comparing the average temperature of the catalyst at 100% conversion. In this case the average catalyst temperature was 335° C. and the results of this test are summarized and tabulated in Table II.

TABLE II
The Effect of Alumina Types on Zeolite-Alumina Hydrocracking Catalysts

| Example | Alumina Type | Fresh Feed Conversion, vol. % | Required Aver.Bed Temp., °C. |
|---|---|---|---|
| 1 | Conventional | 100 | 335 |
| 2 | Ziegler Alumina | 100 | 320 |

EXAMPLE 2

Equal quantities of a Linde Na Y, SK-40, sieve material and Ziegler alumina were admixed and extruded with the aid of a small amount of nitric acid solution through a 2 mm die plate. The extrudate was broken into particles with an L/D of about 3. The extrudate particles were dried for about one hour at 200° F. and then calcined for about one hour at 1100° F. The calcined particles were exchanged with an $NH_4NO_3$ solution to a sodium level of less than 0.5 wt.%. After water washing, the particles were exchanged with a rare earth salt solution in the same manner as hereinabove described in Example 1.

Subsequent to rare earth exchange the support particles were subjected to a calcination conducted at a temperature of about 930° F. over a period of about one hour. A portion of the resulting calcined rare earth exchanged faujasite-Ziegler alumina was impregnated with an aqueous solution containing chloroplatinic acid to yield a finished catalyst with 0.75 wt.% platinum. The impregnated support was dried and then calcined for about one hour at about 1100° F. A portion of the catalyst prepared as hereinabove described was tested in exactly the same manner as described in Example 1. In this case at 100% conversion, the average catalyst temperature was 320° C. and the results of this test are summarized and tabulated in Table II.

From the results of these examples, it is evident that a process using a zeolite-Ziegler alumina catalyst is superior when compared with a process using a conventional zeolite-alumina catalyst. The foregoing specification and examples clearly illustrate the improvements encompassed by the process of the present invention.

We claim as our invention:

1. A process for the conversion of heavy hydrocarbon oil boiling above about 650° F. into lower boiling hydrocarbons, which comprises hydrocracking the heavy oil in admixture with hydrogen and in contact with a catalyst comprising a rare earth exchange metal component and a platinum group metal component supported on a mixture of Ziegler alumina and a zeolite.

2. The process of claim 1 wherein the Ziegler alumina-zeolite weight ratio is from about 1:5 to about 20:1.

3. The process of claim 1 wherein the zeolite is Y faujasite.

4. The process of claim 1 wherein the rare earth metal component is from about 1 weight percent to about 10 weight percent based on the weight of the finished catalyst.

5. The process of claim 1 wherein said platinum group metal is platinum.

6. The process of claim 1 wherein said platinum group metal is palladium.

* * * * *